United States Patent
Kim (10) Patent No.: US 8,958,309 B2
(45) Date of Patent: Feb. 17, 2015

(54) METHOD AND APPARATUS OF COMMUNICATION USING RANDOM LINEAR CODING

(75) Inventor: Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1216 days.

(21) Appl. No.: 12/744,867

(22) PCT Filed: Dec. 9, 2008

(86) PCT No.: PCT/KR2008/007273
§ 371 (c)(1),
(2), (4) Date: Nov. 10, 2010

(87) PCT Pub. No.: WO2009/075509
PCT Pub. Date: Jun. 18, 2009

(65) Prior Publication Data
US 2011/0044180 A1     Feb. 24, 2011

Related U.S. Application Data

(60) Provisional application No. 61/012,787, filed on Dec. 11, 2007.

(30) Foreign Application Priority Data

Jul. 21, 2008    (KR) .................. 10-2008-0070502

(51) Int. Cl.
*H04L 12/26* (2006.01)
*H04L 1/00* (2006.01)
(Continued)

(52) U.S. Cl.
CPC ............ *H04L 1/0026* (2013.01); *H04L 1/1671* (2013.01); *H04L 1/1812* (2013.01); *H04L 25/067* (2013.01)
USPC .......................................... 370/242; 714/780

(58) Field of Classification Search
None
See application file for complete search history.

(56) References Cited

U.S. PATENT DOCUMENTS 6,418,549 B1    7/2002    Ramchandran et al.
6,553,536 B1    4/2003    Hassner et al.
(Continued)

FOREIGN PATENT DOCUMENTS

EP    0 674 316 B1    5/2006
EP    1 623 514 B1    9/2006
(Continued)

OTHER PUBLICATIONS

Marc P. C. Fossorier et al. 'Computationally Efficient Soft-Decoding of Linear Block Codes Based on Ordered Statistics' IEEE Transactions on Information Theory, vol. 42, No. 3, May 1996.
(Continued)

*Primary Examiner* — Rhonda Murphy
(74) *Attorney, Agent, or Firm* — Birch, Stewart, Kolasch & Birch, LLP (57) ABSTRACT

A communication method using random linear coding is disclosed. The communication method using a random linear code comprises receiving first code blocks randomly linear-coded from a transmitter; demodulating the first code blocks using a decision distance determined in accordance with a channel status; determining whether an error has occurred in the first code blocks, using the decision distance, and transmitting a NACK signal to the transmitter, the NACK signal including information of the number of the code blocks where an error has occurred. Since a block error rate can be controlled in accordance with channel status, throughput can be improved.

6 Claims, 7 Drawing Sheets

(51) Int. Cl.
*H04L 1/16* (2006.01)
*H04L 1/18* (2006.01)
*H04L 25/06* (2006.01)

(56) References Cited

U.S. PATENT DOCUMENTS

| | | |
|---|---|---|
| 6,615,382 B1 | 9/2003 | Kang et al. |
| 6,647,528 B1 | 11/2003 | Collette et al. |
| 7,075,917 B2 * | 7/2006 | Herrmann ............ 370/349 |
| 7,213,189 B2 | 5/2007 | Malm |
| 7,320,091 B2 | 1/2008 | Blaauw et al. |
| 7,391,723 B2 | 6/2008 | Collette et al. |
| 7,512,860 B2 * | 3/2009 | Miyazaki et al. ........ 714/751 |
| 2002/0075867 A1 | 6/2002 | Herrmann |
| 2002/0106004 A1 | 8/2002 | Tan |
| 2006/0002484 A1 | 1/2006 | Miyazaki et al. |
| 2006/0149753 A1 | 7/2006 | Medard et al. |
| 2007/0025425 A1 | 2/2007 | El Nahas El Homsi et al. |
| 2007/0030799 A1 | 2/2007 | Kaburaki et al. |
| 2007/0147531 A1 | 6/2007 | Wengerter et al. |
| 2008/0022182 A1 * | 1/2008 | Katayama et al. ........ 714/752 |
| 2009/0187804 A1 | 7/2009 | Shen et al. |
| 2010/0260241 A1 | 10/2010 | Kim |
| 2010/0296601 A1 | 11/2010 | Kim |
| 2011/0041041 A1 | 2/2011 | Kim |
| 2011/0044180 A1 | 2/2011 | Kim |
| 2011/0173517 A1 | 7/2011 | Kim |

FOREIGN PATENT DOCUMENTS

| | | |
|---|---|---|
| KR | 10-2001-0010277 A | 2/2001 |
| KR | 10-2004-0033203 A | 4/2004 |

OTHER PUBLICATIONS

Marc P. C. Fossorier et al. 'Soft-Decision Decoding of Linear Block Codes Based on Ordered Statistics' IEEE Transactions on Ingormation Theory, vol. 41, No. 5, Sep. 1995.

C. Gkantsdis et al., "Multipath Code Casting for Wireless Mesh Networks," Proc. Of CoNEXT 2007, Dec. 10-13, 2007, 12 pages.

* cited by examiner

(a) BPSK (b) 64QAM

Fig. 3

(a) 16 QAM (b) 64QAM

METHOD AND APPARATUS OF COMMUNICATION USING RANDOM LINEAR CODING

This application is the National Phase of PCT/KR2008/007273 filed on Dec. 9, 2008, which claims priority under 35 U.S.C. 119(e) to U.S. Provisional Application No. 61/012,787 filed on Dec. 11, 2007, and under 35 U.S.C. 119(a) to Patent Application No. 10-2008-0070502 filed in Republic of Korea on Jul. 21, 2008, all of which are hereby expressly incorporated by reference into the present application.

TECHNICAL FIELD

The present invention relates to a wireless access system, and more particularly, to a communication method using random liner coding.

BACKGROUND ART

Hereinafter, general modulation technology used in data communication will be described in brief.

Modulation means that signal information, such as intensity of signal (information), displacement, frequency and phase, is converted into a proper type suitable for channel features of a transmission medium. A transmitter can transmit signal information with a long distance by modulating the signal information using a modulation mode suitable for a transmission medium.

When the transmitter modulates data, since the transmitter can perform modulation over a broad frequency band, the transmitter can configure various channels. Also, the transmitter can shorten an antenna length by enhancing frequency. Also, the transmitter can fulfill design requirements such as filtering or amplification during data modulation. Namely, modulation means that a signal containing data is converted into a waveform suitable for a transmission channel.

Phase shift keying (PSK) modulation means that carrier phase is converted in accordance with digital signal information. Since PSK waveform has given amplitude (envelope), it is less affected by level variation of a transmission path and has excellent immunity against symbol error. Also, since carrier is a double side band signal, it has both timing information and frequency information. Accordingly, modulation and demodulation circuits are relatively simple.

Binary PSK is a transmission mode that transmission signals of two values (for example, 0 or 1) to be transmitted correspond to synchronous phase and out-of-phase. Quadrature phase shift keying (QPSK) modulation is a transmission mode that digital signals of two values, i.e., 2 bits of '0' and '1' correspond to four phases of carrier.

Quadrature amplitude modulation (QAM) is mainly used for digital modulation of high speed and performs modulation by simultaneously combining amplitude and phase of carrier (combination of ASK and PSK) to improve transmission efficiency in a limited frequency band.

QAM is also called multi-level modulation. For example, 16-QAM can transfer a total of $2\times8=2^4=16$ kinds of information by respectively determining two amplitude values and eight phase values per one carrier. Namely, QAM is a modulation mode that a unit of phase variation is $\pi/6$ and one period is divided into 12, wherein phase angles corresponding to 4 of 12 have two different amplitude values of a modulated signal to express a total of 16 kinds of information. Accordingly, 16 values can be identified per one symbol during QAM, and 4 bits correspond to each symbol.

QAM enables amplitude modulation and phase modulation simultaneously. For example, respective components (i.e., I: synchronous component and Q: quadrature component) of two carriers (sine curve and cosine curve) of which phase difference is 90° and which has the same frequency are modulated in accordance with a amplitude shift keying (ASK) mode and can be transmitted by being synthesized with each other. Meanwhile, although two size levels (for example, +1 and −1) corresponding to I channel and Q channel are provided in case of QPSK, a plurality of size levels (for example, 4, 6, 8, 10, . . . ) can be provided in case of QAM. Also, 16 QAM can be configured by combination of four phases having four size levels or eight phases having two size levels.

However, in general technology, distorted symbol is determined when a symbol signal transmitted through a communication channel is recovered. At this time, a decoder decodes an original signal by determining the symbol using the best method in spite of an error that may occur. In this case, a problem may occur in that packets should again be received for error correction in spite of an error occurring in several bits within one packet.

DISCLOSURE OF INVENTION

Technical Problem

Accordingly, the present invention is directed to a method and apparatus of communication using random liner coding, which substantially obviates one or more problems due to limitations and disadvantages of the related art.

An object of the present invention is to provide a method of transferring packets, in which packets are transferred using random linear coding to ensure reliability.

Another object of the present invention is to provide a communication method that can detect only bits where an error has occurred by using random linear coding in conjunction with a strict symbol detection method of a modulator.

Other object of the present invention is to provide a method of efficiently transmitting symbol data without error adaptively to modulation of a wireless network.

Technical Solution

In order to solve the above technical problems, the present invention relates to a wireless access system, and more particularly, to a communication method using random liner coding.

In one preferred aspect of the present invention, a communication method using a random linear code comprises receiving first code blocks randomly linear-coded from a transmitter; demodulating the first code blocks using a decision distance determined in accordance with a channel status; determining whether an error has occurred in the first code blocks, using the decision distance, and transmitting a NACK signal to the transmitter, wherein the NACK signal includes information of the number of the code blocks where an error has occurred.

The NACK signal further includes information of changed channel status.

Also, the communication method further comprises receiving second code blocks randomly linear-coded from the transmitter as much as the number of the code blocks where an error has occurred; and performing random linear decoding using the first code blocks and the second code blocks.

In another preferred embodiment of the present invention, a communication method using a random linear code comprises (a) receiving symbols generated by modulating the code blocks, wherein the code blocks are generated by a transmitter using random linear coding; (b) demodulating the symbols to the code blocks using a decision distance according to channel status and randomly linear coding the code blocks; and (c) transmitting a signal including information of the number of symbols and code blocks where an error has occurred in (a) and (b) and information of channel status.

In other preferred embodiment of the present invention, a receiver using a random linear code comprises a first demodulation module receiving first code blocks randomly linear-coded from a transmitter and demodulating the first code blocks using a decision distance determined in accordance with a channel status; and a second demodulation module determining whether an error has occurred in the first code blocks, using the decision distance, and transmitting a NACK signal to the transmitter, wherein the NACK signal includes information of the number of the first code blocks where an error has occurred.

Also, the receiver further comprises a decoder receiving second code blocks randomly linear-coded from the transmitter as much as the number of the first code blocks where an error has occurred and performing random linear decoding using the first code blocks and the second code blocks.

Advantageous Effects

According to the present invention, the following effects can be obtained.

First of all, according to the embodiments of the present invention, when communication is performed between a transmitter and a receiver using random linear coding, it is possible to process and analyze information adaptively in accordance with channel status. In this case, since a block error rate can be controlled in accordance with channel status in a wireless section, throughput can be improved.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

To solve the aforementioned technical problems, the present invention is directed to a wireless access system, and more particularly, to a communication method using random linear coding.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as a user equipment and a mobile subscriber station.

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents.

Also, all terminologies disclosed herein can be described by the above standard documents. Particularly, the embodiments of the present invention can be supported by one or more of standard documents of IEEE 802.16 system, i.e., P802.16-2004, P802.16e-2005 and P802.16Rev2.

Specific terminologies hereinafter described are provided to assist understanding of the present invention, and various modifications can be made in the specific terminologies within the range that they do not depart from technical spirits of the present invention.

In the embodiments of the present invention, data can be coded using a random linear coding (RLC) method. The random linear coding method is one of block coding methods.

The random linear coding method is characterized in that each coded block can include information of all blocks included in an original block set. Accordingly, even though some coded blocks are lost during transmission and reception, a receiver can promptly decode data by receiving another coded blocks without receiving the corresponding coded blocks again. The random linear coding method is only a term for defining a data processing method exemplarily disclosed in the present invention, and various modifications can be made in the term corresponding to the random linear coding method.

Furthermore, in the embodiments of the present invention, RLC coded blocks can be expressed as symbols in accordance with a modulation mode. Namely, in the embodiments of the present invention, terms, i.e., code block and symbol, can be used to refer to the same or like parts. However, to clarify technical spirits, blocks divided from initially input data burst will be referred to as data blocks, and data blocks coded using RLC will be referred to as code blocks. Also, code blocks to which a modulation mode is applied will be referred to as symbols.

Figure 1:
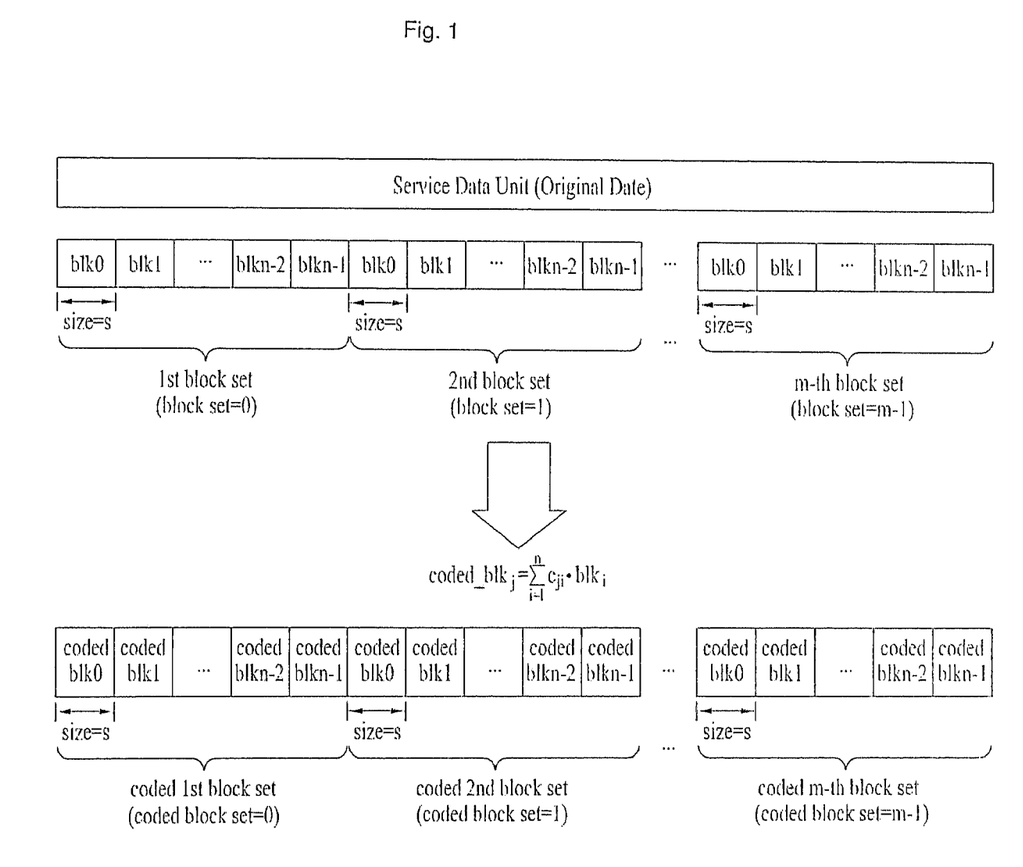
FIG. 1 is a diagram illustrating a procedure of coding data block sets using a random linear coding method that can be applied to the embodiment of the present invention.

FIG. 1 is a diagram illustrating a procedure of coding data block sets using an RLC method that can be applied to the embodiment of the present invention.

Referring to FIG. 1, original data represents a service data unit transferred from an upper layer of a transmitter. The transmitter can divide original data into small blocks (or packets). The transmitter can configure block sets (or segments) by collecting a random number (n) of divided blocks.

At this time, the number (n) of block sets can be determined by channel status of a communication network, throughput information of the transmitter and the receiver, and requirements of an application program. Also, the transmitter can configure a total m number of original block sets.

The transmitter generates a random coefficient or random coefficient matrix (cji) for coding the divided data blocks. The transmitter can code the divided data blocks using the random coefficient matrix (cji) generated in accordance with a given rule.

The transmitter can perform coding using the RLC method in a unit of block sets (for example, per n number of selected blocks). At this time, a set of n number of coded blocks can be referred to as a coded block set. The receiver can perform decoding if coded blocks equivalent to selected n number of blocks are received. Hereinafter, since the coded block set is a code block set, the coded blocks will be referred to as code blocks.

Each of code blocks generated using the RLC method can include information of all blocks included in the original block set. Accordingly, in order to recover a series of information blocks from the code blocks received by the receiver, random coefficients used to code n number of code blocks and data blocks are required.

The transmitter generates new random coefficients until the receiver fully decodes data, and generates code blocks to transmit them to the receiver. At this time, n number of code blocks do not need to be transmitted to the receiver in the coded order, and are independent from each other.

The following Equation 1 illustrates an example of a method of generating a code block set ($\overline{E}$) generated by coding an original block set ($\overline{S}$).

$$\overline{E} = \overline{H} \times \overline{S} \qquad \text{[Equation 1]}$$

In the Equation 1, $\overline{H}$ means a coefficient matrix and represents a method of combining original block sets ($\overline{S}$). A method of generating a coefficient matrix ($\overline{H}$) will be described as follows.

The coefficient matrix ($\overline{H}$) used in the RLC method can be generated using a random number determined by either the transmitter or both the transmitter and the receiver within a given range. The random number means a number randomly extracted from given numbers (for example, 0~255) determined by either the transmitter or consultation between the transmitter and the receiver. Also, the transmitter and the receiver can generate a coefficient matrix ($\overline{H}$) by sharing a seed value required to generate a random coefficient. At this time, a size of the coefficient matrix ($\overline{H}$) can be defined as n×n.

The following Equation 2 illustrates another expression of the above Equation 1.

$$\text{coded\_blk}_j = \sum_{i=1}^{n} c_{ji} \cdot blk_i \qquad \text{[Equation 2]}$$

In the Equation 2, a code block can be expressed as coded-$blk_j$, and a coefficient matrix can be expressed as $c_{ji}$. Also, an original block can be expressed as $blk_i$.

If the transmitter transmits all of n number of code blocks of the first code block set and the receiver receives the n number of code blocks, the receiver can decode the original block set. Afterwards, the transmitter transmits code blocks included in the second block set. In this way, data communication is performed.

Hereinafter, a method of controlling an error using an RLC method in accordance with the preferred embodiments of the present invention will be described.

In order to perform communication using the RLC method, a size of a data block set, a size of a coded block, and a Galois field (GF) of a random coefficient are defined. The GF can be defined as follows. In case of $GF(2^2)$, symbols of 2 bits are calculated, and in case of $GF(2^8)$, symbols of 8 bits are calculated.

If the size of the data block set and the size of the code block are defined, the number of coded blocks required for decoding can be determined. The transmitter can perform coding using random coefficients required for coding in accordance with the defined Galois field. The random coefficients may be transmitted together with the coded blocks when the coded blocks are transmitted. Alternatively, only index of a random coefficient used when the transmitter and the receiver decode each code block using the same information may be transmitted. In case of sequential data transmission in which a transmitted signal is not lost during communication, previously defined random coefficients can sequentially be used for coding and decoding.

Figure 2:
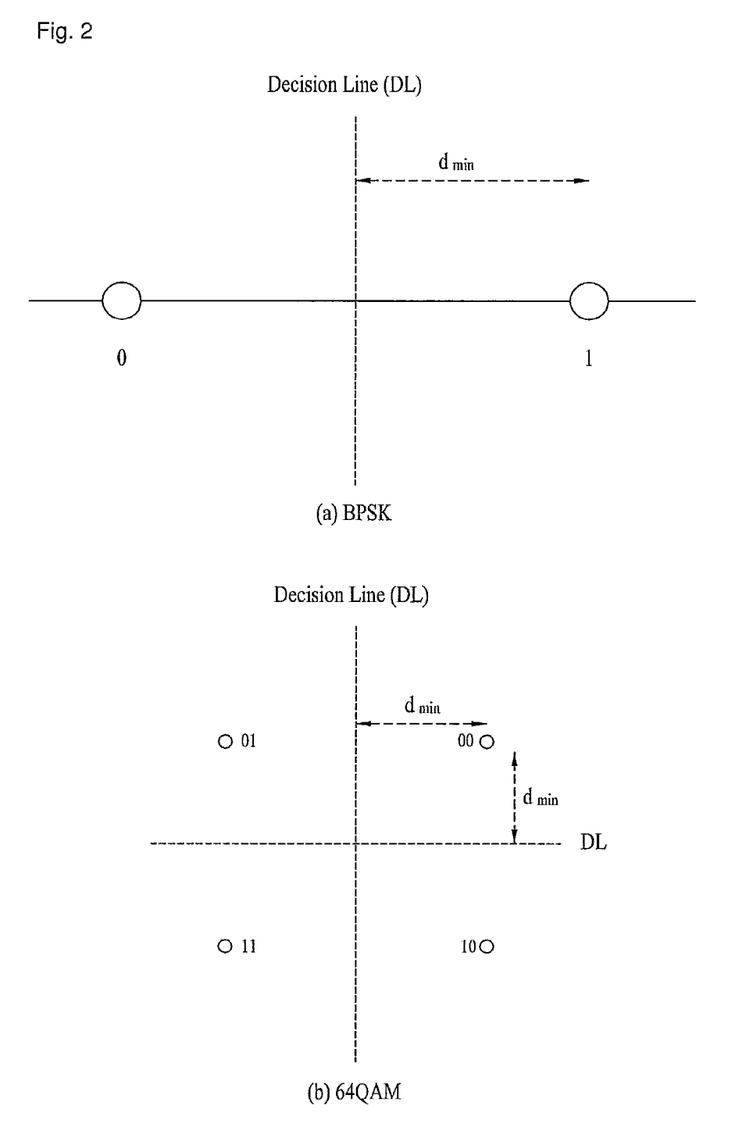
FIG. 2 is a diagram illustrating a minimum distance used for hard decision during multi-phase shift modulation and signal detection.

FIG. 2 is a diagram illustrating a minimum distance used for hard decision during multi-phase shift modulation and signal detection.

In order to convert binary data into electric magnetic (EM) signal and transmit and receive the converted data on a communication network, modulation and demodulation are used. A representative example of the modulation mode includes multiple phase shift keying (MPSK).

The transmitter modulates data to be transmitted to the receiver. The transmitter divides bit streams to be transmitted into bits that can be represented by corresponding modulation, sequentially converts bits into modulated symbols and then transmits the converted symbols. The receiver estimates modulated symbols received through a communication channel as a signal closest to the distorted signal and demodulates the symbols to bits. At this time, the standard used for signal estimation is a minimum distance ($d_{min}$).

Referring to FIG. 2, MPSK can be identified by binary PSK (BPSK) and quadrature phase shift keying (QPSK) in accordance with information that can represent information per symbol, wherein the BPSK can represent information of 1 bit and the QPSK can represent information of 2 bits. In addition, MPSK can be identified by 8 PSK that can represent information of 3 bits.

In FIG. 2(a), a decision line which is the standard for dividing information of 1 bit is a vertical axis. When a vertical axis is used as a reference axis, the distance from the vertical axis to symbol represents a minimum distance ($d_{min}$) used for soft decision.

In FIG. 2(b), decision lines which are the standards for dividing information of 2 bits are a vertical axis and a horizontal axis. Namely, a plane is divided into quadrants, each of which includes symbols. In FIG. 2(b), a minimum distance ($d_{min}$) used for soft decision can be represented by a distance on the horizontal axis and the vertical axis.

Figure 3:
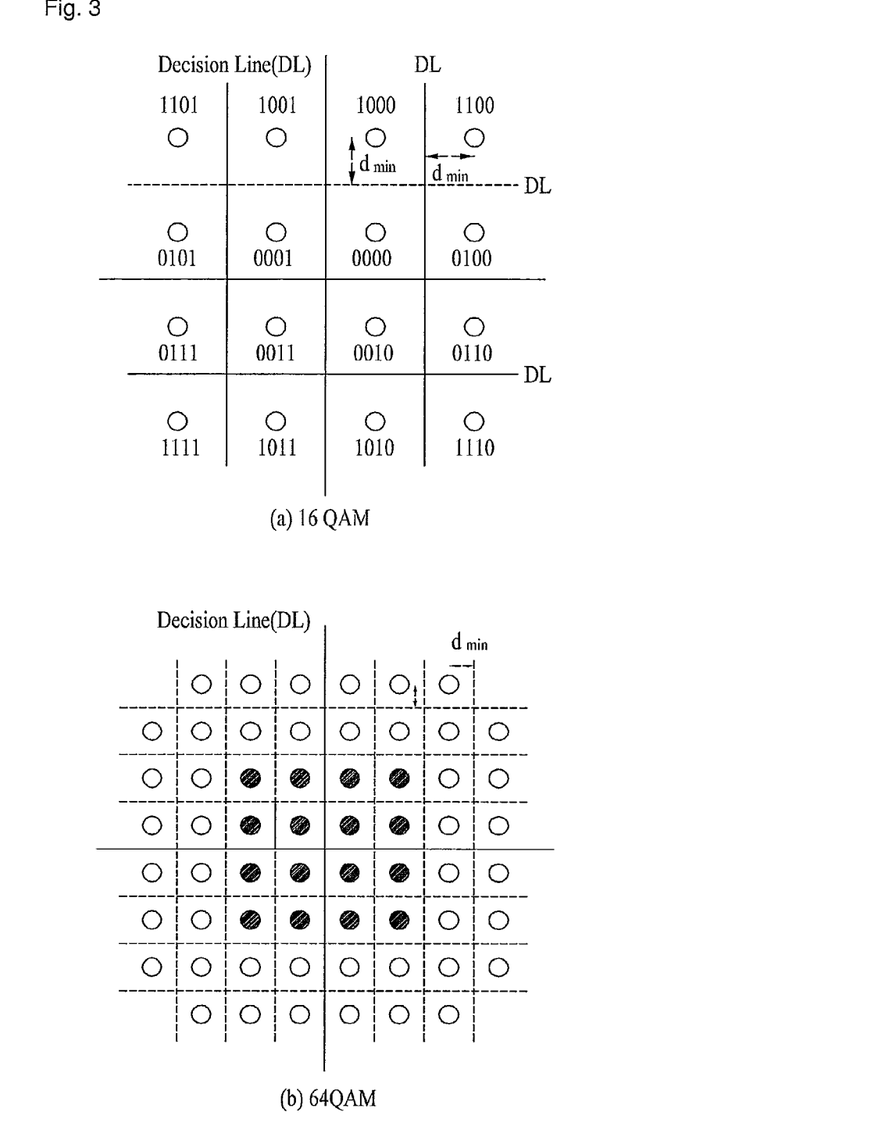
FIG. 3 is a diagram illustrating a minimum distance used for hard decision during quadrature amplitude modulation and signal detection.

FIG. 3 is a diagram illustrating a minimum distance used for hard decision during quadrature amplitude modulation and signal detection.

Another representative example of the modulation mode includes quadrature amplitude modulation (QAM). The QAM can be divided into 16 QAM that can represent information of 4 bits and 64 QAM that can represent information of 6 bits.

In FIG. 3(a), a decision line which is the standard for dividing information of 4 bits can represented by dividing each quadrant into a horizontal axis and a vertical axis based on the vertical axis and the horizontal axis. Accordingly, each quadrant is subdivided into four parts to represent information of a total of 4 bits.

In FIG. 3(b), decision lines which are the standards for dividing information of 8 bits are seven vertical axes and seven horizontal axes. Accordingly, information of a total of 8 bits can be represented based on the vertical axes and the horizontal axes.

Figure 4:
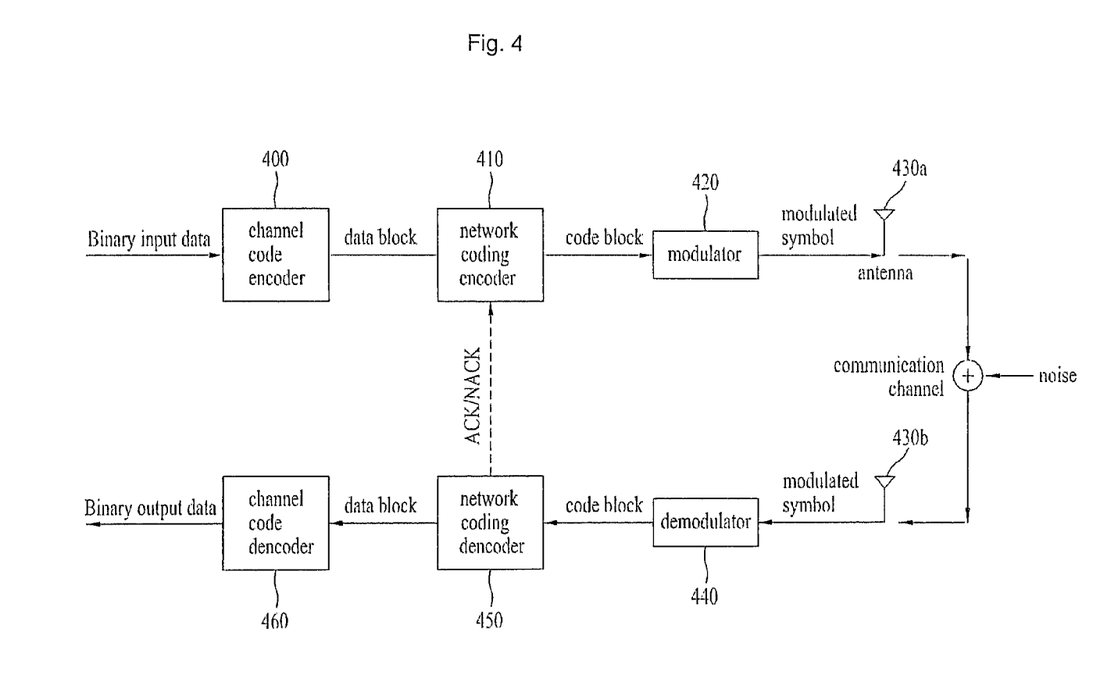
FIG. 4 is a block diagram illustrating a transmitter and a receiver to which one embodiment of the present invention is applied.

FIG. 4 is a block diagram illustrating a transmitter and a receiver to which one embodiment of the present invention is applied.

In FIG. 4, the transmitter includes a channel code encoder 400, a network coding encoder 410, a modulator 420, and an antenna 430a. The receiver includes an antenna 430b, a demodulator 440, a network coding decoder 450, and a channel code decoder 460.

Referring to FIG. 4, binary input data are input to the channel code encoder 400. The binary input data are encoded to proper data blocks through the channel code encoder 400. The data blocks are input to the network coding encoder 410. The network coding encoder 410 can encode the data blocks to the code blocks through RLC encoding method. At this time, the method illustrated in FIG. 1 can be used as the RLC encoding method.

The network coding encoder transmits the RLC encoded code blocks to the modulator 420. The code blocks are modulated to symbols by the modulator 420. The transmitter transmits the modulated symbols to the receiver through a communication channel formed between the transmitter and the receiver. Namely, the symbols propagated through the antenna 430a of the transmitter are transmitted to the antenna 430b of the receiver through the communication channel. At this time, noise may occur on the communication channel.

The modulated symbols received through the antenna of the receiver are transferred to the demodulator 440. The demodulator 440 performs demodulation in accordance with a demodulation mode determined by channel status. In FIG. 4, the demodulator can detect the transmitted signal based on the strict standard. Severity of signal detection is a decision distance ($d_d$) and can be changed dynamically. At this time, the decision distance ($d_d$) becomes short if the strict standard is required.

The code blocks demodulated by the demodulator 440 are input to the network coding decoder 450. The network coding decoder 450 decodes the code blocks to the data blocks using RLC decoding method. However, even though a strict signal detection rule is used by the demodulator 440, an error may occur in the received signal. To correct such an error, the network coding decoder 450 can request the transmitter to retransmit symbols equivalent to the number of errors using ACK/NACK signals.

The channel code decoder 460 which has received the data blocks from the network coding decoder 450 combines the data blocks to perform conversion of the data blocks to binary output data. However, the channel code encoder 400 and the channel code decoder 460 are selectively used in accordance with a user's requirements and can play a complementary role to each other.

Figure 5:
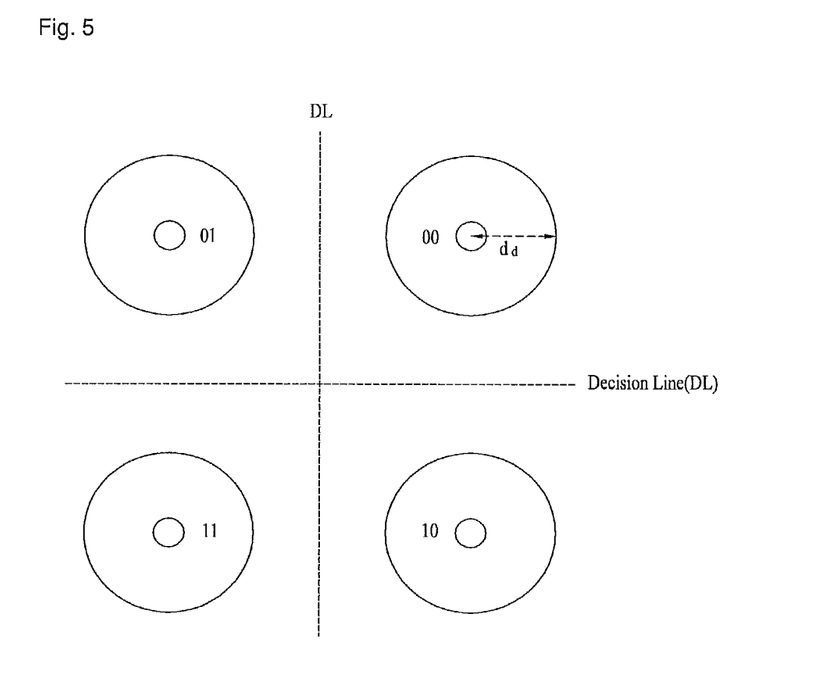
FIG. 5 is a diagram illustrating QPSK to which a strict signal detection rule is applied in accordance with one embodiment of the present invention.

FIG. 5 is a diagram illustrating QPSK to which a strict signal detection rule is applied in accordance with one embodiment of the present invention.

In FIG. 5, the receiver applies a strict signal detection method to QPSK. The signal detection method can be applied to other modulation modes. Referring to FIG. 5, severity of signal detection during demodulation can be determined by the decision distance dd. Also, the decision distance can be changed dynamically in accordance with the channel status.

At this time, the decision distance dd becomes short if the strict rule is required when the receiver detects a signal. Namely, if the decision distance is short, although an error of signal decision little occurs, all signals which do not belong to the decision distance have errors. On the other hand, if the decision distance is long, although many symbols can be processed simultaneously, an error of signal decision is likely to occur in the receiver. For this reason, a wrong signal may occur. Accordingly, it is preferable that the decision distance of signal detection used in the present invention is dynamically changed in accordance with a status of a corresponding communication channel.

For example, the transmitter can control a data processing rate by making the decision distance long if the communication channel status is good and making the decision distance short if the channel status is not good. Namely, since the transmitter controls the decision distance to become short if the channel status is good, the transmitter can perform reliable communication owing to the reduced probability of error even though the data processing rate is reduced. Also, the transmitter controls the decision distance to become long if the channel status is not good, thereby increasing the data processing rate.

An error may occur during signal detection even though the demodulator uses the strict signal rule. For example, if the communication status is good, the transmitter can propagate a signal to a desired place. However, the signal may have an error. Accordingly, to correct such an error, the network coding decoder of the receiver can request the transmitter to retransmit code blocks as much as the number of errors.

The transmitter generates code blocks as much as the number requested from the receiver and then transmits the generated code blocks to the receiver. The receiver can successfully perform RLC decoding using the retransmitted code blocks.

Figure 6:
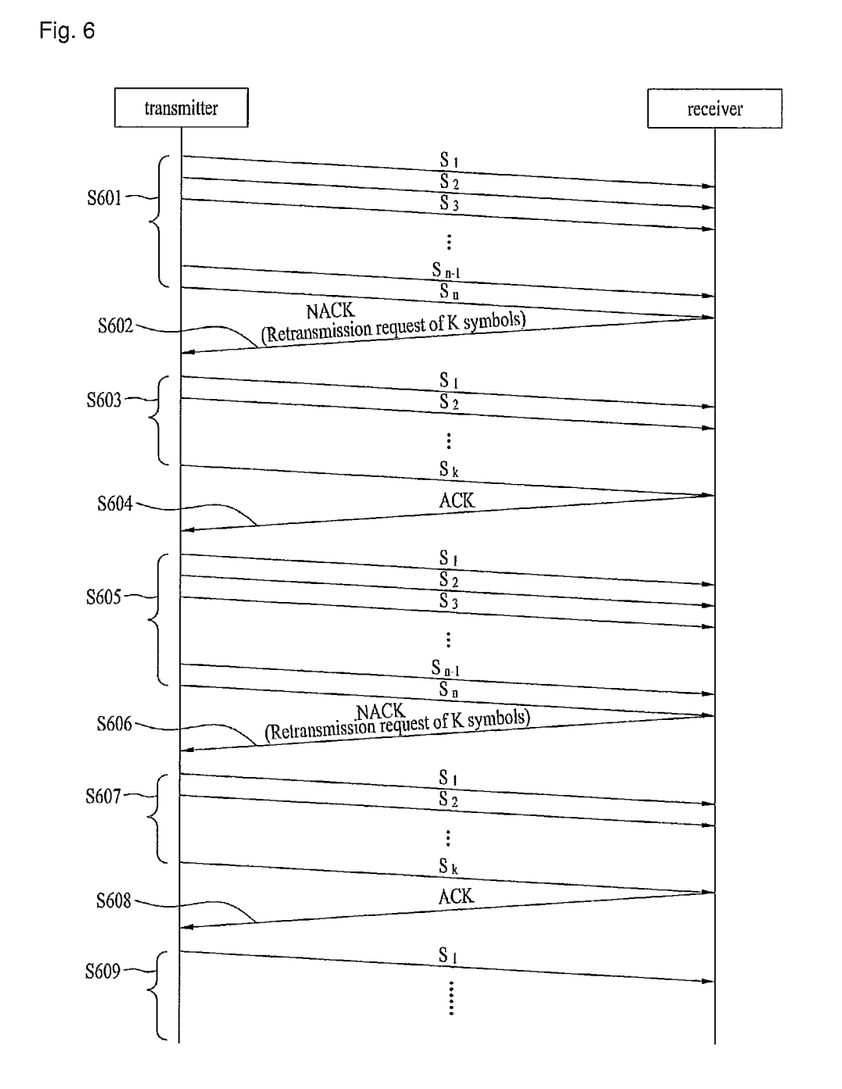
FIG. 6 is a diagram illustrating a method of correcting an error using a strict signal detection rule and RLC in accordance with one embodiment of the present invention.

FIG. 6 is a diagram illustrating a method of correcting an error using a strict signal detection rule and RLC in accordance with one embodiment of the present invention.

In FIG. 6, the transmitter generates code blocks to be transmitted to the receiver. The method of generating code blocks using RLC can refer to FIG. 1.

The transmitter divides data burst transferred to a physical layer into segments. Segment represents RLC encoded or decoded unit. Namely, segment can be referred to as a data block set before RLC is applied thereto, and can be referred to as a code block set after RLC is applied thereto.

A size of each segment can be determined by consultation between the transmitter and the receiver when the transmitter and the receiver are initially connected with each other. If the size of the segment is determined, the number of code blocks required for one segment can be determined. Also, the transmitter can determine the segment to have the same size as that of a transmission unit (for example, code block) used in hybrid automatic repeat request (HARQ), thereby performing HARQ.

Figure 7:
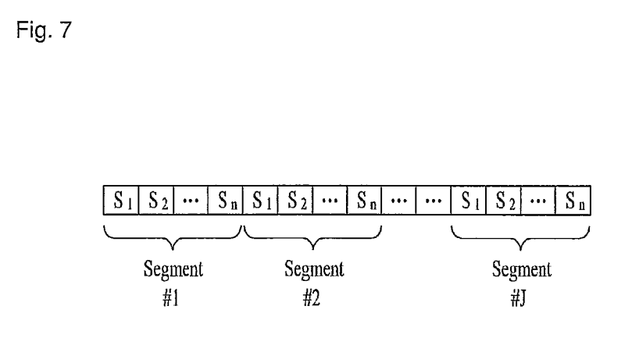
FIG. 7 is a diagram illustrating segments configured after data blocks are coded and modulated to code blocks and symbols are converted in accordance with one embodiment of the present invention.

FIG. 7 is a diagram illustrating segments configured after data blocks are coded and modulated to code blocks and symbols are converted in accordance with one embodiment of the present invention.

Referring to FIG. 7, the transmitter can generate a total of T number of segments. Also, the transmitter can include 'n' number of symbols in each segment. 'n' or T are random values and can be changed depending on the user's requirements or system status. The method of generating code blocks before symbols are configured in FIG. 7 can refer to FIG. 1.

Referring to FIG. 6 again, the transmitter configures segments as illustrated in FIG. 7 and sequentially transmits symbols ($S_1, S_2, \ldots, S_n$) included in the first segment (Segment #1) to the receiver (S601).

In S601, the symbols do not need to be transmitted to the receiver in due order. It is sufficient that the symbols equivalent to the number (n) configuring one segment are all transmitted to the receiver. If a seed value, which is used when random coefficients are transmitted together with symbols or random coefficients are generated, is transmitted to the receiver, the symbols do not need to be transmitted to the receiver in due order. However, in the embodiment of the present invention, it is assumed that symbols are sequentially transmitted to the receiver to use random coefficients previously agreed between the transmitter and the receiver when the receiver and the transmitter use RLC.

The receiver sequentially receives the symbols from the transmitter. The demodulator of the receiver transfers only symbols determined that they have no error to the network coding decoder of the receiver using the strict signal detection rule. Also, the network coding decoder of the receiver decodes the symbols using RLC decoding. The receiver should request the transmitter to retransmit new symbols as much as the number (for example, K number of symbols) of symbols of which error has been detected by the demodulator and the network coding decoder. Accordingly, the receiver transmits NACK (Non-Acknowledgement) signal to the transmitter, wherein the NACK signal includes information of the number (K) of symbols having an error (S602).

In S602, the receiver can acquire information of channel status when receiving the symbols from the transmitter. Accordingly, the receiver can transmit the NACK signal including information of channel status to the transmitter.

The transmitter which has received the NACK signal can generate new k number of code blocks using a random coefficient different from the random coefficient used when the code blocks included in the first segment (Segment #1) are generated using RLC decoding.

For example, the transmitter can generate k number of code blocks using the random coefficient, which is used when the last code block of the first segment is generated, and next random coefficients sequentially. Also, the transmitter can vary the modulation mode based on the information of channel status transmitted from the receiver. However, it is preferable that code blocks included in the same segment are modulated using the same modulation mode (S603).

In S603, the transmitter can use a modulation mode dynamically in accordance with the channel status. Namely, if the channel status is good, the transmitter can transfer data to the receiver by increasing a modulation rate of the data based on the stricter standard, thereby reducing an error rate of the data. Although the data processing rate of the transmitter is reduced if the modulation rate increases, since the error rate of the data is reduced due to good channel status, efficient data communication can be performed.

Furthermore, if the channel status is not good, the transmitter can transmit data to the receiver by reducing the modulation rate. In this case, the error rate may increase. However, since the data processing rate increases, efficient data communication can be performed. Namely, if the transmitter generates symbols by varying the modulation rate dynamically in accordance with the channel status, more efficient communication can be performed than communication to which a fixed modulation rate is applied.

If the receiver receives k number of symbols ($S_1, S_2, \ldots, S_k$) without error and successfully performs demodulation and decoding, the receiver can recover original data of the first segment. Also, the receiver can acquire information of the channel status while receiving k number of symbols. Accordingly, the receiver can transmit ACK signal to the transmitter to notify the transmitter of successful decoding and information of the changed channel status.

The transmitter which has received the ACK signal determines that the receiver has successfully received the first segment and has performed modulation and decoding. Accordingly, the transmitter can sequentially transmit symbols including the second segment (S605).

If the receiver detects an error in k number of symbols, the receiver can transmit NACK signal to the transmitter to notify that k number of errors have occurred (S606).

The transmitter again configures k number of symbols. Namely, the transmitter can again generate k number of code blocks using the random coefficient used when the second segment is configured, and can transmit the code blocks to the receiver after modulating the code blocks to symbols (S607).

After receiving k number of retransmitted symbols, the receiver can recover the original data by demodulating and decoding the second segment. Accordingly, the receiver transmits ACK signal to the transmitter (S608).

The aforementioned steps can be repeated until the transmitter transmits the $J_{th}$ segment (S609).

The random coefficient ($c_{j,i}$) used in the present invention can be generated by selecting a Galois field (GF) according to modulation. For example, if the transmitter performs modulation using the QPSK mode, 2 bits are converted into one symbol. Accordingly, since the transmitter should generate code blocks of 2 bits through network coding (for example, random linear coding), the transmitter uses $GF(2^2)$ to generate the random coefficient. In case of 16 QAM mode, since 4 bits are used, the transmitter uses $GF(2^4)$. Also, in case of 64 QAM mode, since 6 bits are used, the transmitter can use $GF(2^6)$ to generate the random coefficient.

Accordingly, the random coefficients used for RLC encoding are optionally selected within the Galois field (GF) selected in accordance with modulation. Since the code blocks generated using RLC encoding are also generated through Galois field operation, they can be expressed as one number within the used Galois field.

In the embodiment of the present invention, it is assumed that the random coefficients are previously generated and shared by the transmitter and the receiver. When starting communication, the transmitter and the receiver can determine the number of blocks to be used for coding and decoding of network coding through consultation or a previously defined value.

The following Equation 3 illustrates an example of a matrix of the random coefficients.

$$\begin{bmatrix} c_1 \\ c_2 \\ c_3 \\ \vdots \\ \vdots \\ c_3 \\ c_3 \\ \vdots \\ c_k \\ \vdots \end{bmatrix} = \begin{bmatrix} c_{1,1} & c_{1,2} & \cdots & c_{1,n-1} & c_{1,n} \\ c_{2,1} & c_{2,2} & \cdots & c_{2,n-1} & c_{2,n} \\ c_{3,1} & c_{3,1} & \cdots & c_{3,n-1} & c_{3,n} \\ \vdots & \vdots & \cdots & \vdots & \vdots \\ c_{j-1,1} & c_{j-1,2} & \cdots & c_{j-1,n-1} & c_{j-1,n} \\ c_{j,1} & c_{j,2} & \cdots & c_{j,n-1} & c_{j,n} \\ \vdots & \vdots & \cdots & \vdots & \vdots \\ c_{k,1} & c_{k,2} & \cdots & c_{k,n-1} & c_{k,n} \\ \vdots & \vdots & \cdots & \vdots & \vdots \end{bmatrix}$$ [Equation 3]

In the Equation 3, $c_k$ is a vector illustrating column, and $c_{j,i}$ are random coefficients selected within the Galois field. The transmitter and the receiver can sequentially use the random coefficients expressed in FIG. 3 for coding and decoding after previously storing the random coefficients from the time when they are synchronized with each other. Also, the transmitter can transfer index numbers of the generated random coefficients to the receiver in accordance with the user's requirements or system status. The receiver can perform decoding using the random coefficients corresponding to the received indexes.

The receiver performs symbol detection using a physical signal (for example, EM signal) sampled using a sampling period from the time when the transmitter and the receiver are synchronized with each other. Accordingly, if the transmitter and the receiver are synchronized with each other during initial communication, they can use the random coefficients sequentially. An example of synchronization between the transmitter and the receiver includes a method of selecting a coefficient using a frame number of a frame. Also, another example of synchronization between the transmitter and the receiver may include a method of notifying a random coefficient applied to a corresponding code block by notifying correlation between a frame and a random coefficient through specific information included in the frame.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

The invention claimed is:

1. A communication method using a random linear code, the communication method comprising:
    receiving from a transmitter, first code blocks randomly linear-coded by the transmitter;
    demodulating the first code blocks by the transmitter using a decision distance determined in accordance with a channel status;
    determining whether an error has occurred in the first code blocks using the decision distance;
    transmitting a non-acknowledgement (NACK) signal to the transmitter when the error has occurred, wherein the NACK signal includes information of a number of code blocks where the error has occurred among the first code blocks; and
    receiving from the transmitter, second code blocks, as many as the number of code blocks where the error has occurred among the first code blocks, randomly linear-coded by the transmitter,
    wherein the second code blocks are generated by using different random coefficients from random coefficients used for the first code blocks.

2. The communication method of claim 1, wherein the NACK signal further includes information of changed channel status.

3. The communication method of claim 2, further comprising:
    performing random linear decoding using the first code blocks and the second code blocks.

4. A communication method using a random linear code, the communication method comprising:

(a) receiving from a transmitter, first symbols generated by modulating first code blocks, wherein the first code blocks are generated by the transmitter using random linear coding;

(b) demodulating the first symbols to the first code blocks using a decision distance according to channel status and randomly linear decoding the first code blocks;

(c) transmitting to the transmitter, a signal including information of a number of symbols and code blocks where an error has occurred in (a) and (b) and information of channel status among the first symbols and the first code blocks; and (d) receiving from the transmitter, second symbols, as many as the number of symbols and code blocks where the error has occurred, generated by modulating second code blocks, wherein the second code blocks are generated by using different random coefficients from random coefficients used for the first code blocks.

5. A receiver using a random linear code, the receiver comprising:

a first demodulation module configured to receive from the transmitter, first code blocks randomly linear-coded by the transmitter, and to demodulate the first code blocks using a decision distance determined in accordance with a channel status;

a second demodulation module configured to determine whether an error has occurred in the first code blocks using the decision distance, and to transmit a non-acknowledgement (NACK) signal to the transmitter when the error has occurred, wherein the NACK signal includes information of a number of code blocks where the error has occurred among the first code blocks; and a decoder configured to receive from the transmitter, second code blocks, as many as the number of code blocks where the error has occurred among the first code blocks, randomly linear-coded by the transmitter, wherein the second code blocks are generated by using different random coefficients from random coefficients used for the first code blocks, and wherein the first demodulation module, the second demodulation module, and the decoder are implemented as hardware components.

6. The receiver of claim 5, wherein the decoder is further configured to perform random linear decoding using the first code blocks and the second code blocks.

* * * * *